UNITED STATES PATENT OFFICE.

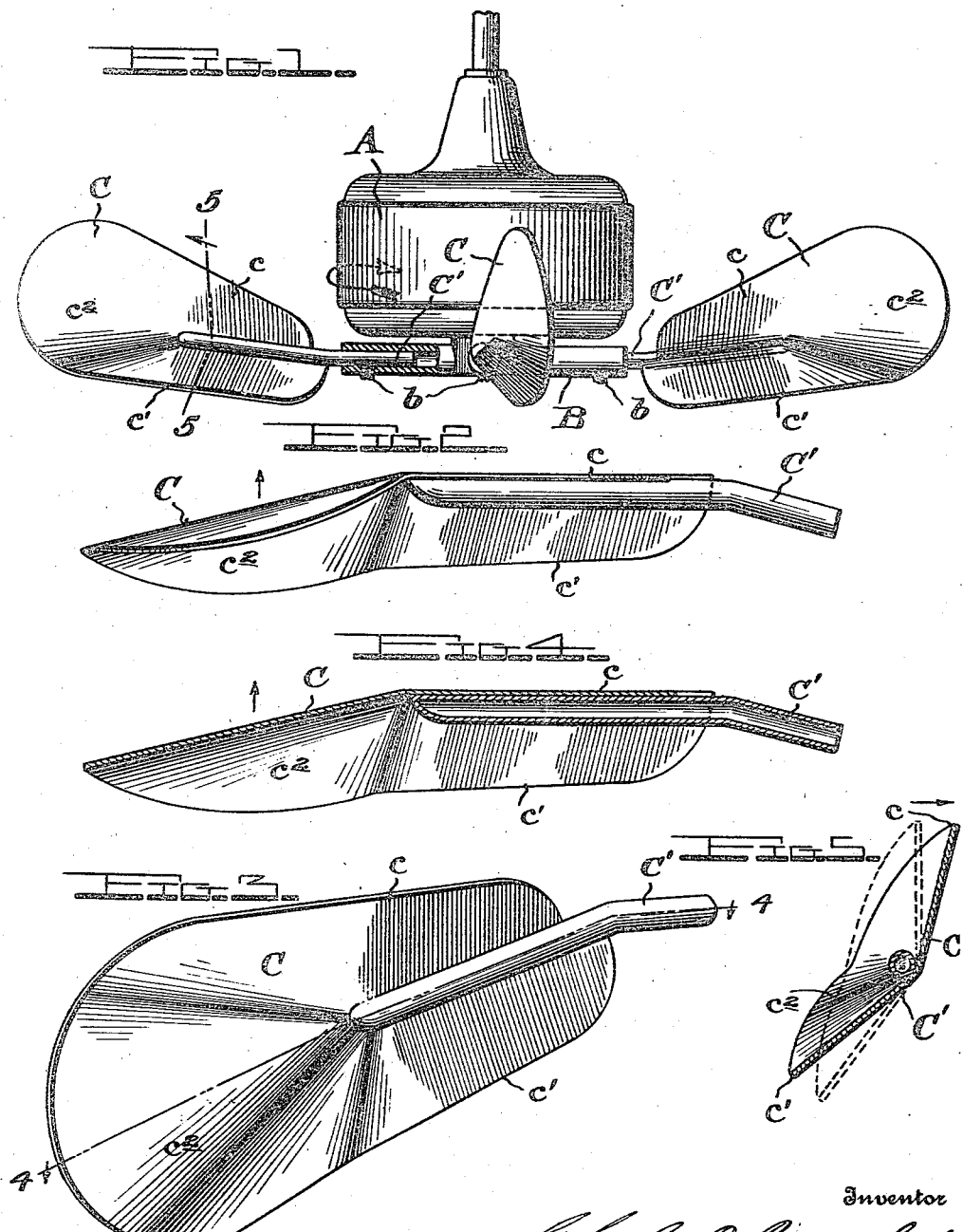

CHARLES P. BANZHOF, OF LANCASTER, PENNSYLVANIA, ASSIGNOR OF ONE-FOURTH TO LEVI W. HORTING, ONE-FOURTH TO CHARLES F. STAUFFER, AND ONE-FOURTH TO BENJAMIN G. STAUFFER, ALL OF LANCASTER, PENNSYLVANIA.

FAN-BLADE.

1,150,241.  Specification of Letters Patent.  Patented Aug. 17, 1915.

Application filed August 24, 1914. Serial No. 858,221.

*To all whom it may concern:*

Be it known that I, CHARLES P. BANZHOF, a citizen of the United States, residing at Lancaster, in the county of Lancaster and State of Pennsylvania, have invented certain new and useful Improvements in Fan-Blades; and I hereby declare that the following is a full, clear, and exact description thereof, reference being had to the accompanying drawings, which form part of this specification.

This invention relates to rotary fans for use in producing a circulation of air, for ventilating and cooling rooms and other purposes, and more particularly to fans of the propeller type used in private residences, hotels, &c. and having paddles, blades or vanes which radiate from a common center or axis on which the fan revolves.

The object of the invention is to provide a fan of improved construction having peculiarly shaped blades especially designed and adapted to create cooling blasts or gusts of wind and cause the air in motion to spread and sweep over a large area and also direct currents of air downwardly or at right angles to the axis of rotation or shaft on which the fan revolves, thus covering much more space than is covered by fans as heretofore constructed and used for such purposes.

The invention will first be hereinafter described, with reference to the accompanying drawings, which form a part of this specification, and then pointed out in the claims at the end of the description.

In said drawings, Figure 1 is a side elevation, partly in section, of a rotary fan embodying my invention; Fig. 2 illustrates one of the fan blades detached, as seen from a point above, when arranged in the position shown in Fig. 1. Fig. 3 is a perspective view of one of said blades, as seen from the rear or side thereof opposite the direction of rotation; Fig. 4 is a longitudinal sectional view, taken on the line 4—4 of Fig. 3, and Fig. 5 is a cross section, taken on the line 5—5 of Fig. 1 looking in the direction of the arrow.

Referring to the drawings, in which the same reference characters are used to denote corresponding parts in different views, the letter A may denote an ordinary electric motor adapted to be suspended from the ceiling or other overhead support and having attached to the armature shaft of the motor a series of tubular arms B, each carrying a paddle, blade or vane C, constructed in accordance with my invention. Any desired number of such blades may be used, four being used in the construction shown. The blade C is of oblong form and angular in cross section, gradually enlarging or flaring toward its free or outer end. For a distance preferably about equal to one-half its length the blade is straight on a median line and has its side portions $c$, $c^1$, inclined from said median line at an obtuse angle to each other, as indicated more clearly in Fig. 5 of the drawings. A tang $C^1$ is welded or otherwise secured to said blade along said median line, being also straight the length of its union with said straight portion of the blade, and has its free end inclined at an obtuse angle to said straight portion in order that the blade may be arranged in said position and at the required angle to produce the desired result. From a point preferably about midway of its length the larger or flaring portion of the blade extends at an angle to said straight portion and also has its sides slightly curved or inclined laterally at an obtuse angle to each other, and said enlarged portion is also inclined rearwardly at an obtuse angle to said centrally disposed straight portion of the smaller half of the blade; the angle of inclination of the sides of said larger portion gradually decreasing from its junction with said smaller portion to the outer end thereof. I thus provide a blade which when placed in the position shown in Fig. 1 of the drawings presents in the direction of rotation a straight impact surface, provided by the part $c$, and a downwardly and rearwardly inclined surface provided by the part $c^1$, and an outwardly and rearwardly inclined surface $c^2$ of greater extent than the combined surfaces of the parts $c$ and $c^1$; said surface $c^2$ gradually merging into a nearly flat portion at the outer end of the blade, whereby the fan blades are adapted to collect and direct currents of air from and along said surfaces downwardly, or in a direction at right angles to the axis of rotation, and radially or outwardly, spreading and sweeping over a large area in a blast or gust of wind.

It will be understood, of course, that the size of the blades may be varied according to the requirements or wishes of the user or manufacturer, and that their positions may be changed as desired, to which end the shank of the blade may be adjustably secured within the tubular arm or spoke B by means of a set screw $b$, which will permit adjustment for increasing the diameter of the circle described by the fan blades, and also rotatively, for changing the angle of inclination of the impact and inclined surfaces of the blades, as indicated by the different positions shown in full and dotted lines in Fig. 5 of the drawings.

Having thus described my invention, what I claim as new and desire to secure by Letters Patent of the United States is:

1. A fan blade of oblong form gradually enlarging or increasing in width toward its free end, the sides of the inner smaller portion thereof being inclined at an obtuse angle to each other from a line extending about midway longitudinally of the blade and the sides of its outer larger portion being similarly inclined from said line; the inclination of the sides of said outer portion gradually decreasing to the extreme outer end of the blade.

2. A fan blade of oblong form gradually enlarging or increasing in width toward its free end, the sides of the inner smaller portion thereof being inclined at an obtuse angle to each other from a line extending about midway longitudinally of the blade and the sides of its outer larger portion being similarly inclined from said line; said smaller portion being straight along said inclined line and having a tang secured thereto, and said larger portion being inclined at an obtuse angle to said straight part; the inclination of the sides of said outer portion gradually decreasing to the extreme outer end of the blade.

3. A rotary fan comprising a plurality of blades extending radially from a rotating head or shaft, said blades being oblong in form and enlarging or increasing in width toward their outer ends, the sides of the smaller portions thereof being inclined at an obtuse angle to each other for about one-half the length of the blade and from that point the sides of the larger portions being similarly inclined and said larger portions also inclined rearwardly, the inclination of the sides of the larger portions gradually decreasing toward the free ends of the blades and the smaller portions thereof being straight along a line extending longitudinally of the blade about midway thereof.

4. A fan blade of the propeller type constructed in oblong form gradually increasing in width toward its outer end; the sides of its inner smaller portion being inclined at an angle to each other and substantially flat on their front faces, said sides merging into the larger outer portion, the sides of which are similarly inclined from their junction with said inner portion, the latter being straight along a median line and said outer portion being also inclined at an obtuse angle to said straight portion; the inclination of the sides of said larger portion gradually diminishing toward the free end of the blade.

In testimony that I claim the foregoing as my own, I affix my signature in presence of two witnesses.

CHARLES P. BANZHOF.

Witnesses:
 CHAS. F. STAUFFER,
 M. C. STONER.